US012327932B2

(12) United States Patent
Wang et al.

(10) Patent No.: US 12,327,932 B2
(45) Date of Patent: Jun. 10, 2025

(54) ULTRA WIDE BAND ANTENNA STRUCTURE AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Xichao Fan, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,441

(22) PCT Filed: Feb. 18, 2022

(86) PCT No.: PCT/CN2022/076915
§ 371 (c)(1),
(2) Date: Jan. 16, 2023

(87) PCT Pub. No.: WO2023/155163
PCT Pub. Date: Aug. 24, 2023

(65) Prior Publication Data
US 2024/0250429 A1 Jul. 25, 2024

(51) Int. Cl.

| | |
|---|---|
| ***H01Q 9/04*** | (2006.01) |
| ***H01Q 1/48*** | (2006.01) |
| ***H01Q 13/10*** | (2006.01) |

(52) U.S. Cl.
CPC ............. *H01Q 9/0407* (2013.01); *H01Q 1/48* (2013.01); *H01Q 13/10* (2013.01)

(58) Field of Classification Search
CPC .. H01Q 1/36; H01Q 1/38; H01Q 1/48; H01Q 1/50; H01Q 1/243; H01Q 5/25; H01Q 9/0407; H01Q 9/045; H01Q 13/10
See application file for complete search history.

(56) References Cited

U.S. PATENT DOCUMENTS 5,510,803 A * 4/1996 Ishizaka ................. H01Q 21/24 343/846
2006/0119529 A1 6/2006 Krupezevic et al.
2011/0057853 A1 * 3/2011 Kim ..................... H01Q 9/0442 343/846

(Continued)

FOREIGN PATENT DOCUMENTS

CN 103730722 A 4/2014
CN 104733842 A 6/2015

(Continued)

*Primary Examiner* — Tung X Le
(74) *Attorney, Agent, or Firm* — IPro, PLLC

(57) ABSTRACT

An ultra wide band antenna structure and an electronic device. The ultra wide band antenna structure includes: a dielectric substrate; an antenna structure, located on a side of the dielectric substrate; the antenna structure includes a radiation patch and a feeder line; and a ground layer, located on a side of the dielectric substrate facing away from the antenna structure; the radiation patch has a first hollowed-out slit, and a length of the first hollowed-out slit is related to λ/2; and λ represents a wave length in a frequency band of a needed notch wave.

20 Claims, 14 Drawing Sheets

(56) References Cited

U.S. PATENT DOCUMENTS

| | | | | |
|---|---|---|---|---|
| 2012/0169554 | A1* | 7/2012 | Behdad | H01Q 9/40 343/742 |
| 2013/0169496 | A1* | 7/2013 | Miyoshi | H01Q 13/16 343/767 |
| 2014/0132474 | A1* | 5/2014 | Guan | H01P 1/20381 343/862 |
| 2016/0141757 | A1* | 5/2016 | Lai | H01Q 9/285 343/770 |
| 2016/0149307 | A1* | 5/2016 | Matsumura | H01Q 5/364 343/700 MS |
| 2023/0130741 | A1* | 4/2023 | Itami | H01Q 9/045 343/702 |

FOREIGN PATENT DOCUMENTS

| | | | |
|---|---|---|---|
| CN | 108598694 | A | 9/2018 |
| CN | 113206377 | A | 8/2021 |
| CN | 113410636 | A | 9/2021 |

* cited by examiner

ULTRA WIDE BAND ANTENNA STRUCTURE AND ELECTRONIC DEVICE

CROSS REFERENCE TO RELATED APPLICATIONS

The present disclosure is a national phase entry under 35 U.S.C § 371 of International Application No. PCT/CN2022/076915, filed Feb. 18, 2022, and entitled "ULTRA WIDE BAND ANTENNA STRUCTURE AND ELECTRONIC DEVICE".

FIELD

The present disclosure relates to the field of microwave communication, in particular to an ultra wide band antenna structure and an electronic device.

BACKGROUND

Ultra Wide Band (UWB) antennas have advantages of being wide in frequency band range, enough in channel capacity, high in transmission speed, capable of resisting noise and disturbance in complicated environments and the like, are quickly applied to a short-distance communication system, and the UWB antennas are the focus of attention in the field of communication as an emerging communication technology.

SUMMARY

Embodiments of the present disclosure provide an ultra wide band antenna structure, including:

a dielectric substrate;

an antenna structure, located on a side of the dielectric substrate, the antenna structure includes a radiation patch and a feeder line; and a ground layer, located on a side of the dielectric substrate facing away from the antenna structure;

the radiation patch has a first hollowed-out slit, and a length of the first hollowed-out slit is related to λ/2; and λ represents a wave length in a frequency band of a needed notch wave.

In some examples, in a same antenna structure, the first hollowed-out slit is located in a side of the radiation patch away from the feeder line.

In some examples, the first hollowed-out slit includes a first slit part; and the first slit part extends in a first direction.

In some examples, the first hollowed-out slit further includes a second slit part and a third slit part, the second slit part and the third slit part respectively extend in a second direction, and the first direction intersects with the second direction; and the second slit part is connected with a first end of the first slit part, the third slit part is connected with a second end of the first slit part, and the first slit part extends from the first end of the first slit part to the second end of the first slit part.

In some examples, the feeder line has a second hollowed-out slit, and a length of the second hollowed-out slit is related to λ/2.

In some examples, the second hollowed-out slit includes a fourth slit part; and the fourth slit part is in an n shape.

In some examples, the radiation patch further includes a fifth slit part and a sixth slit part which are mirrored;

the fifth slit part is connected with a first end of the fourth slit part;

the sixth slit part is connected with a second end of the fourth slit part; and the fourth slit part extends from the first end of the fourth slit part to the second end of the fourth slit part.

In some examples, the antenna structure further includes a branch structure connected with the radiation patch; the branch structure is arranged at a side of the radiation patch away from the feeder line; and a gap is formed between an orthographic projection of the radiation patch on the dielectric substrate and an orthographic projection of the branch structure on the dielectric substrate.

In some examples, the branch structure extends in the first direction, and a length of the branch structure is related to λ/2.

In some examples, the radiation patch is annularly arranged on the dielectric substrate; the ground layer is annularly arranged on the dielectric substrate;

an orthographic projection of the radiation patch on the dielectric substrate does not overlap with an orthographic projection of the ground layer on the dielectric substrate; and an orthographic projection of the feeder line on the dielectric substrate overlaps with the orthographic projection of the ground layer on the dielectric substrate.

In some examples, the orthographic projection of the ground layer on the dielectric substrate is approximately rectangular.

In some examples, at least one inner vertex angle of the rectangle is an arc.

In some examples, at least one antenna element is arranged on the dielectric substrate, and each antenna element includes two antenna structures; and in a same antenna element, the two antenna structures are symmetrically mirrored and oppositely arranged.

In some examples, different antenna elements are sequentially arranged at intervals along a same direction.

In some examples, connecting lines of the antenna structures in at least two antenna elements intersect with each other.

In some examples, the radiation patch includes a monopole structure.

An electric device provided by the embodiments of the present disclosure includes the above ultra wide band antenna structure.

DETAILED DESCRIPTION OF THE EMBODIMENTS

Figure 1A:
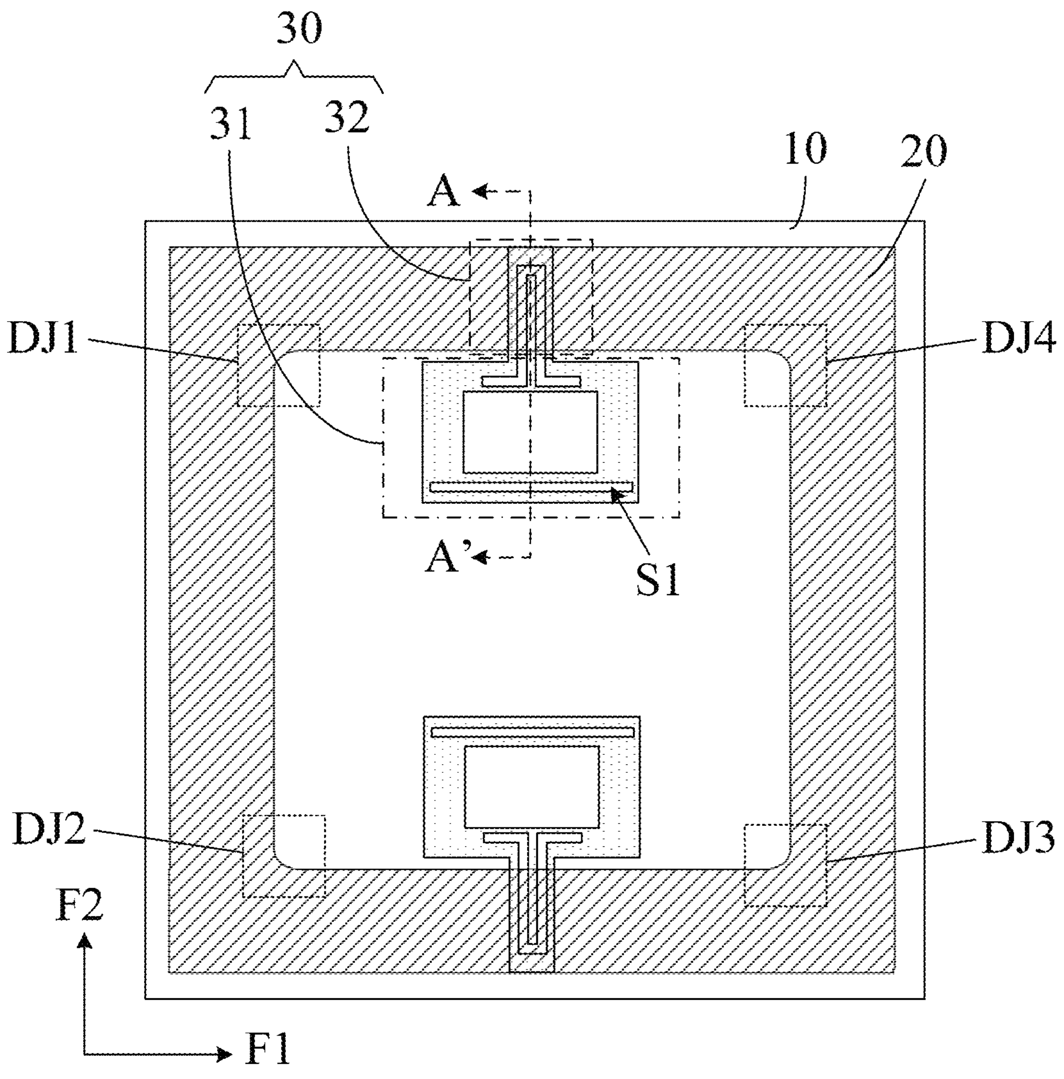
FIG. 1A is a structural schematic diagram of an ultra wide band antenna structure provided by an embodiment of the present disclosure.

In order to enable objectives, technical solutions and advantages of the embodiments of the present disclosure to be clearer, the technical solutions of the embodiments of the present disclosure will be described clearly and completely in combination with the accompanying drawings of the embodiments of the present disclosure below. Apparently, the described embodiments are only a part of the embodiments of the present disclosure, not all of the embodiments. In addition, the embodiments of the present disclosure and features in the embodiments may be combined with each other without conflict. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the ordinary meanings understood by those of ordinary skill in the art to which the present disclosure pertains. The words “first”, “second” and the like used in the present disclosure do not represent any sequence, quantity or importance, but are merely used to distinguish different constituent parts. The words “include” or “comprise” and the like indicate that an element or item appearing before such word covers listed elements or items appearing after the word and equivalents thereof, and does not exclude other elements or items. The words “connect” or “link” and the like are not limited to physical or mechanical connection, but may include electrical connection, whether direct or indirect.

It should be noted that the size and the shape of each diagram in the accompanying drawings do not reflect a true scale, and are merely intended to illustrate contents of the present disclosure. The same or similar numerals all the time represent the same or similar elements or elements with the same or similar functions.

As a new technology, Ultra Wide Band (UWB) antennas become a hot research topic in the field of antennas in recent years. Because of an extremely wide bandwidth, for example, an UWB frequency band allowed in the United States and the Asia-Pacific region is 3.1 GHz to 10.6 GHz, which means that a communication system may reach a transmission rate of several hundred megabits, so the Ultra Wide Band (UWB) antennas have a wide application prospect. Although the Ultra Wide Band antennas have existed for a long time, such as a non-frequency variable antenna, a horn antenna, a mirror antenna and the like, however, the Ultra Wide Band antennas meeting the requirements of a modern Ultra Wide Band wireless communication system, especially the miniaturization and easy integration, will undoubtedly be the main direction of research in the future. The Ultra Wide Band antennas can reliably work in a crowded electromagnetic environment and a poor signal-to-noise ratio environment. The Ultra Wide Band antennas cannot cause electromagnetic interference to surrounding electric devices due to extremely low transmission power. The Ultra Wide Band antennas can effectively restrain multipath interference due to intrinsic short distance, and may suitable for simultaneous connection of a plurality of independent signals. The signal frequency in the Ultra Wide Band technology is enough high and does not need extra carrier frequency. The Ultra Wide Band antennas are high in transmission rate, and can meet the information transmission requirements of various devices, thereby gaining more and more attention in the military, commercial and other fields.

The Ultra Wide Band antennas cannot cause electromagnetic interference to the surrounding electronic devices due to extremely low transmission power during Ultra Wide Band communication, but will be interfered by other narrowband communication systems. The following wireless narrowband systems mainly exist in the UWB communication system: a global microwave Internet frequency band (WiMAX, 3.4 GHz-3.69 GHZ), a wireless local area network frequency band (WLAN, 5.15 GHz-5.825 GHz), a satellite communication frequency band (8.025 GHZ-8.4 GHz) and other communication systems. In order to restrain the potential interference between the Ultra Wide Band system and a narrowband system, a filter generally needs to be additionally arranged at an antenna input front end, which increases the manufacturing cost of the antennas and is not beneficial to miniaturization of the antennas, so the Ultra Wide Band antennas with a self notch wave function become a hot research topic in recent years.

Figure 1B:
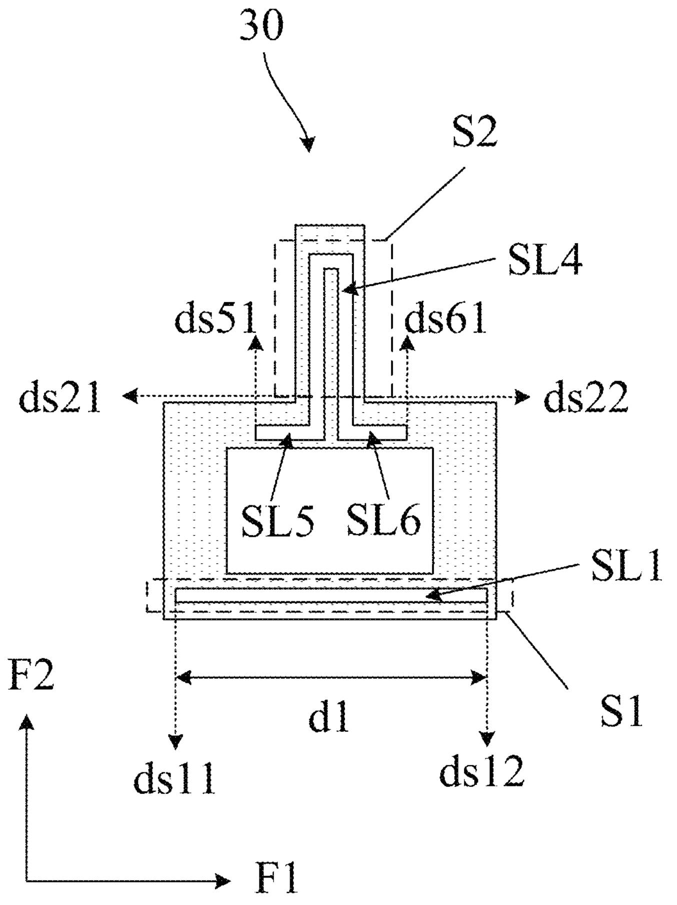
FIG. 1B is a structural schematic diagram of a radiation patch provided by an embodiment of the present disclosure.
Figure 2:
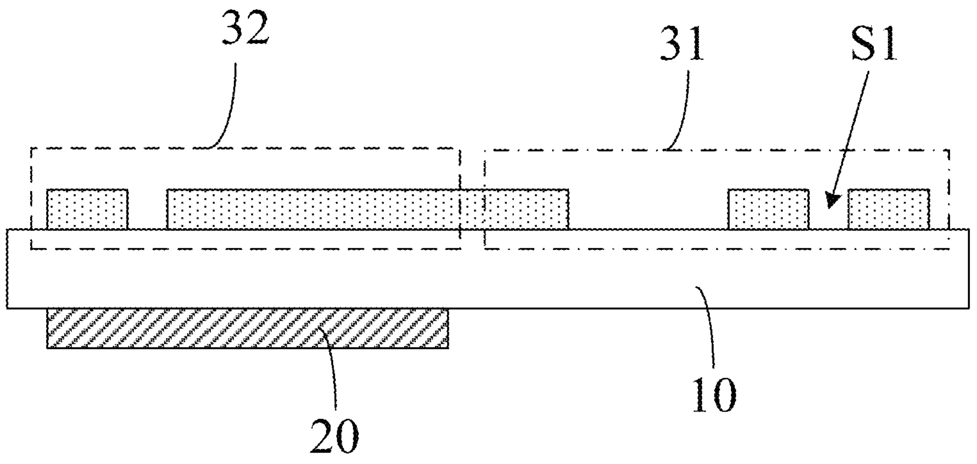
FIG. 2 is a section view structural schematic diagram in a direction AA' in FIG. 1A.

Embodiments of the present disclosure provide an Ultra Wide Band antenna structure, as shown in FIG. 1A to FIG. 2, the Ultra Wide Band antenna structure may include a dielectric substrate 10, an antenna structure 30 and a ground layer 20, and the antenna structure 30 is located on a side of the dielectric substrate 10, and the ground layer 20 is located on a side of the dielectric substrate 10 facing away from the antenna structure 30. Exemplarily, the dielectric substrate 10 may be formed through a dielectric layer, and the dielectric layer may be formed by adopting insulating materials. Optionally, a dielectric constant dk and a loss factor df of the dielectric substrate 10 may meet: dk/df=2.2/0.0009, and in addition, a thickness h1 of the dielectric substrate 10 in a direction perpendicular to a plane where the dielectric substrate 10 is located may be 1.0 mm. Certainly, in practical application, dk/df and h1 may be determined according to the requirements of practical application, which is not limited here.

In some embodiments of the present disclosure, as shown in FIG. 1A to FIG. 2, the antenna structure 30 includes a radiation patch 31 and a feeder line 32, and the radiation patch 31 and the feeder line 32 are connected with each other to realize edge feed. In addition, the radiation patch 31 has a first hollowed-out slit S1, and a length d1 of the first hollowed-out slit S1 is related to λ/2, wherein λ represents a wave length in a frequency band of a needed notch wave. Exemplarily, the length d1 of the first hollowed-out slit S1 is a distance between a first end ds11 and a second end ds12 which are oppositely arranged in an extension direction of the first hollowed-out slit S1. For example, when the frequency band of the needed notch wave is a frequency band corresponding to a wireless local area network, λ may be evaluated from 5.15 GHz to 5.825 GHz. For example, when the frequency band of the needed notch wave is a frequency band corresponding to a satellite communication system, λ may be evaluated from 8.025 GHz to 8.4 GHz. In this way, the first hollowed-out slit S1 may serve as a band resistance structure to realize notch wave characteristics of the antenna structure 30 in the needed frequency band to avoid interference with other communication systems in narrow frequency bands.

In some embodiments of the present disclosure, the length of the first hollowed-out slit S1 may roughly be equal to λ/2. λ may be close to or equal to a midpoint wave length in the frequency band of the needed notch wave, for example, when the frequency band of the needed notch wave is the frequency band corresponding to the wireless local area network, A can be determined as 5.4875 GHz or 5.6 GHz in 5.15 GHZ-5.825 GHz. In this way, the notch wave characteristics of the antenna structure 30 in different needed frequency bands may be realized by adjusting the length of the first hollowed-out slit S1.

In some embodiments of the present disclosure, as shown in FIG. 1A to FIG. 2, in the same antenna structure 30, the first hollowed-out slit S1 may be located in a side of the radiation patch 31 away from the feeder line 32. Exemplarily, the first hollowed-out slit S1 may be located in an edge of the radiation patch 31 away from the feeder line 32. Certainly, in practical application, the first hollowed-out slit S1 may be located in other positions in the radiation patch 31, which is not limited here.

In some embodiments of the present disclosure, as shown in FIG. 1A to FIG. 2, the first hollowed-out slit S1 may include a first slit part SL1, the first slit part SL1 extends in a first direction F1, that is, the first slit part SL1 forms the first hollowed-out slit S1, so that the first hollowed-out slit S1 may be arranged to be a strip-type slit.

In some embodiments of the present disclosure, as shown in FIG. 1A to FIG. 2, the feeder line 32 may have a second hollowed-out slit S2, and a length of the second hollowed-out slit S2 is related to λ/2. Exemplarily, the length d2 of the second hollowed-out slit S2 is a distance between a first end ds21 and a second end ds22 which are oppositely arranged in an extension direction of the second hollowed-out slit S2. For example, when the frequency band of the needed notch wave is the frequency band corresponding to the wireless local area network, λ may be evaluated from 5.15 GHz to 5.825 GHz. For example, when the frequency band of the needed notch wave is the frequency band corresponding to the satellite communication system, λ may be evaluated from 8.025 GHz to 8.4 GHz. In this way, the second hollowed-out slit S2 may serve as a band resistance structure to realize notch wave characteristics of the antenna structure 30 in the needed frequency band to avoid interference with other communication systems in narrow frequency bands.

In some embodiments of the present disclosure, as shown in FIG. 1A to FIG. 2, the length d1 of the first hollowed-out slit S1 is different from the length d2 of the second hollowed-out slit S2, in this way, the first hollowed-out slit S1 and the second hollowed-out slit S2 may respectively notch different frequency bands, so as to enable the antenna structure 30 to notch different frequency bands.

In some embodiments of the present disclosure, as shown in FIG. 1A to FIG. 2, the second hollowed-out slit S2 may include a fourth slit part SL4. Exemplarily, the fourth slit part SL4 may be in an n shape. As shown in FIG. 2, an extension direction of the fourth slit part SL4 with an n-shape structure may have two changes, for example, the fourth slit part SL4 extends in a second direction F2 first, then is converted to extend in a first direction F1 from the second direction F2, and then is converted to extend in the second direction F2 from the first direction F1.

In some embodiments of the present disclosure, as shown in FIG. 1A to FIG. 2, the radiation patch 31 may further include a fifth slit part SL5 and a sixth slit part SL6 which are mirrored. In addition, the fifth slit part SL5 is connected with a first end ds21 of the fourth slit part SL4, and the sixth slit part SL6 is connected with a second end ds22 of the fourth slit part SL4. In this way, the fourth slit part SL4, the fifth slit part SL5 and the sixth slit part SL6 may form a slit in a shape of a Chinese character "几". A length of the slit in the shape of the Chinese character "几" may be a length between an end ds51 of the left side and an end ds61 of the right side along the slit in the shape of the Chinese character "几". The length of the slit in the shape of the Chinese character "儿" may be related to λ/2. Exemplarily, the length of the slit in the shape of the Chinese character "几" may be roughly equal to λ/2. In this way, the slit in the shape of the Chinese character "几" may serve as a band resistance structure to realize notch wave characteristics of the antenna structure 30 in the needed frequency band to avoid interference with other communication systems in narrow frequency bands.

Exemplarily, the fourth slit part SL4 is mirrored along a first symmetric axis in the second direction F2, and the fifth slit part SL5 and the sixth slit part SL6 are also mirrored along the first symmetric axis. For example, the fifth slit part SL5 may be arranged in a ┘ shape, and the sixth slit part SL6 may be arranged in an L shape. Certainly, the shape of the fifth slit part SL5 and the shape of the sixth slit part SL6 may also be determined according to the requirements of the practical application, which is not limited here.

In some embodiments of the present disclosure, the first direction intersects with the second direction. Exemplarily, the first direction may be perpendicular to the second direction.

In some embodiments of the present disclosure, as shown in FIG. 1A to FIG. 2, the radiation patch 31 may be annularly arranged on the dielectric substrate 10, and the ground layer 20 may be annularly arranged on the dielectric substrate 10.

An orthographic projection of the radiation patch 31 on the dielectric substrate 10 does not overlap with an orthographic projection of the ground layer 20 on the dielectric substrate 10, and an orthographic projection of the feeder line 32 on the dielectric substrate 10 overlaps with the orthographic projection of the ground layer 20 on the dielectric substrate 10.

In some embodiments of the present disclosure, as shown in FIG. 1A to FIG. 2, the radiation patch 31 and the feeder line 32 are arranged at the same layer with the same material. In this way, graphs of the radiation patch 31 and the feeder line 32 may be formed by adopting the same composition technology, thus, the preparation technology may be simplified, the production cost may be saved, and the production efficiency may be improved. Exemplarily, materials of the radiation patch 31 may be metal materials, such as Au, Ag, Cu, and Al, which is not limited here.

In some embodiments of the present disclosure, a thickness of a film layer where the radiation patch 31 and the feeder line 32 are located may be set to be 30.0 mm-40.0 mm. For example, the thickness of the film layer where the radiation patch 31 and the feeder line 32 are located may be set to be 30.0 mm, 35.0 mm or 40.0 mm. Certainly, the thickness of the film layer where the radiation patch 31 and the feeder line 32 are located may also be determined according to the requirements of the practical application, which is not limited here.

In some embodiments of the present disclosure, materials of the ground layer 20 may be metal materials, such as Au, Ag, Cu and Al, which is not limited here.

In some embodiments of the present disclosure, a thickness of a film layer where the ground layer 20 is located may be set to be 30.0 mm-40.0 mm. For example, the thickness of the film layer where the ground layer 20 is located may be set to be 30.0 mm, 35.0 mm or 40.0 mm. Certainly, the thickness of the film layer where the ground layer 20 is located may be determined according to the requirements of the practical application, which is not limited here.

Figure 3:
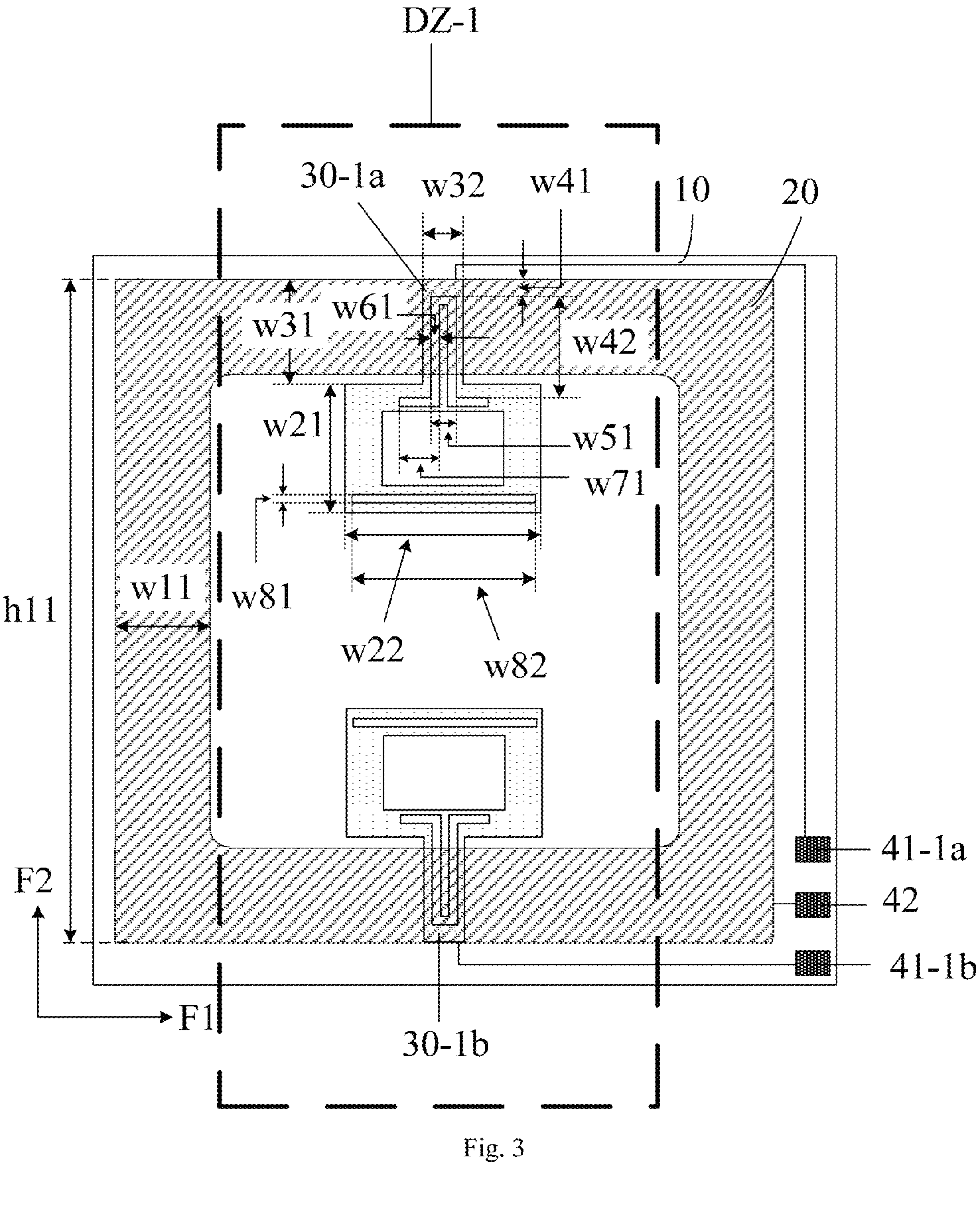
FIG. 3 is another structural schematic diagram of an ultra wide band antenna structure provided by an embodiment of the present disclosure.

In some embodiments of the present disclosure, as shown in FIG. 1A and FIG. 3, an area enclosed by the orthographic projection of the ground layer 20 on the dielectric substrate 10 may be roughly rectangular, such as a square and a rectangle. Exemplarily, at least one inner vertex angle (such as DJ1, DJ2, DJ3 and DJ4) of the rectangle may be an arc. For example, each of the inner vertex angles (such as DJ1, DJ2, DJ3 and DJ4) of the rectangle may be arranged as an arc, that is, the inner vertex angles DJ1, DJ2, DJ3 and DJ4 are all arranged as arcs. In this way, arc processing is performed at the inner vertex angles of the rectangle to realize impedance matching. For example, when the area enclosed by the orthographic projection of the ground layer 20 on the dielectric substrate 10 is roughly square, a length h11 of side of the square may be set to be 50 mm. When the area enclosed by the orthographic projection of the ground layer 20 on the dielectric substrate 10 is annular, a width w11 of the annulus may be set to be 7.0 mm. Certainly, in practical application, h11 and w11 may be determined according to the requirements of the practical application, which is not limited.

In some embodiments of the present disclosure, as shown in FIG. 1A and FIG. 3, an area enclosed by the orthographic projection of the radiation patch 31 on the dielectric substrate 10 may be roughly rectangular, such as a square and a rectangle. Exemplarily, when the area enclosed by the orthographic projection of the radiation patch 31 on the dielectric substrate 10 is the rectangle, a width w21 of the orthographic projection of the radiation patch 31 on the dielectric substrate 10 in the second direction F2 may be set to be 9.5 mm, a width w22 of the orthographic projection of the radiation patch 31 on the dielectric substrate 10 in the first direction F1 may be set to be 15.0 mm, a width w82 of the first slit part SL1 in the first direction F1 may be set to be 9.0 mm, and a width w81 of the first slit part SL1 in the second direction F2 may be set to be 0.6 mm. Certainly, in practical application, w21, w22, w82 and w81 may be determined according to the requirements of the practical application, which is not limited here.

In some embodiments of the present disclosure, as shown in FIG. 1A and FIG. 3, the radiation patch 31 may include a monopole structure. In this way, the radiation patch 31 with the monopole structure may be adopted to form an ultra wide band antenna structure.

In some embodiments of the present disclosure, as shown in FIG. 1A, FIG. 1B and FIG. 3, a width w31 of the orthographic projection of the feeder line 32 on the dielectric substrate 10 in the second direction F2 may be set to be 8.0 mm, a width w32 of the orthographic projection of the feeder line 32 on the dielectric substrate 10 in the first direction F1 may be set to be 3.0 mm, a width w41 between a side, away from the radiation patch 31, of the second hollowed-out slit S2 and a side, away from the radiation patch 31, of the feeder line 32 may be set to be 1.0 mm, a width w42 between a side, away from the radiation patch 31, of the second hollowed-out slit S2 and a side, away from the radiation patch 31, of a part of the sixth slit part SL6 in the first direction F1 may be set to be 8.0 mm, a width w51 of the second hollowed-out slit S2 in the first direction F1 may be set to be 1.50 mm, a slit width w61 of the second hollowed-out slit S2 may be set to be 0.6 mm, a slit width of the fifth slit part SL5 may also be set to the same width as the w61, a slit width of the sixth slit part SL6 may also be set to the same width as the w61, a width w71 of the fifth slit part SL5 in the first direction F1 may also be set to be 3.10 mm, and the width of the fifth slit part SL5 in the first direction F1 may also be set to the same width as the w71. Certainly, the above numerical values may also be determined according to the requirements of the practical application, which is not limited here.

In some embodiments of the present disclosure, at least one antenna element is arranged on the dielectric substrate 10, and each antenna element includes two antenna structures 30. In addition, in the same antenna element, the two antenna structures are symmetrically mirrored and oppositely arranged. Exemplarily, in combination with FIG. 1B and FIG. 3, an antenna element DZ-1 is arranged on the dielectric substrate 10, the antenna structures 30-1*a* and 30-1*b* in the antenna element DZ-1 are symmetrically mirrored and oppositely arranged, that is, the antenna structure 30-1*a* and the antenna structure 30-1*b* are mirrored along a second symmetric axis in the first direction F1, the feeder line 32 in the antenna structure 30-1*a* is located on a side, away from the antenna structure 30-1*b*, of the radiation patch 31 in the antenna structure 30-1*a*, and the feeder line 32 in the antenna structure 30-1*b* is located on a side, away from the antenna structure 30-1*a*, of the radiation patch 31 in the antenna structure 30-1*b*.

Exemplarily, the ultra wide band antenna structure in the embodiments of the present disclosure may be applied to sending signals or receiving signals, and may be determined according to the requirements of the practical application, which is not limited here.

In some embodiments of the present disclosure, a feeder line bonding pad (PAD) and a grounding bonding pad are arranged on the dielectric substrate, wherein one antenna structure corresponds to one feeder line bonding pad, and feeder lines of the antenna structures are connected with the corresponding feeder line bonding pads. In addition, the ground layer is connected with the grounding bonding pad. Exemplarily, the feeder line bonding pad (PAD) and the grounding bonding pad may be connected with an external control circuit. When the ultra wide band antenna structure in the embodiments of the present disclosure may be applied to sending a signal, the signal may be sent under the control of the external control circuit. When the ultra wide band antenna structure in the embodiments of the present disclosure may be applied to receiving a signal, the received signal may be sent to the external control circuit. Exemplarily, as shown in FIG. 3, the feeder line bonding pads (PAD) 41-1*a*, 41-1*b* and the grounding bonding pad 42 are arranged on the dielectric substrate 10. The antenna structure 30-1*a* is connected with the feeder line bonding pad 41-1*a*, the antenna structure 30-1*b* is connected with the feeder line bonding pad 41-1*b*, and the ground layer 20 is connected with the grounding bonding pad 42.

Figure 4:
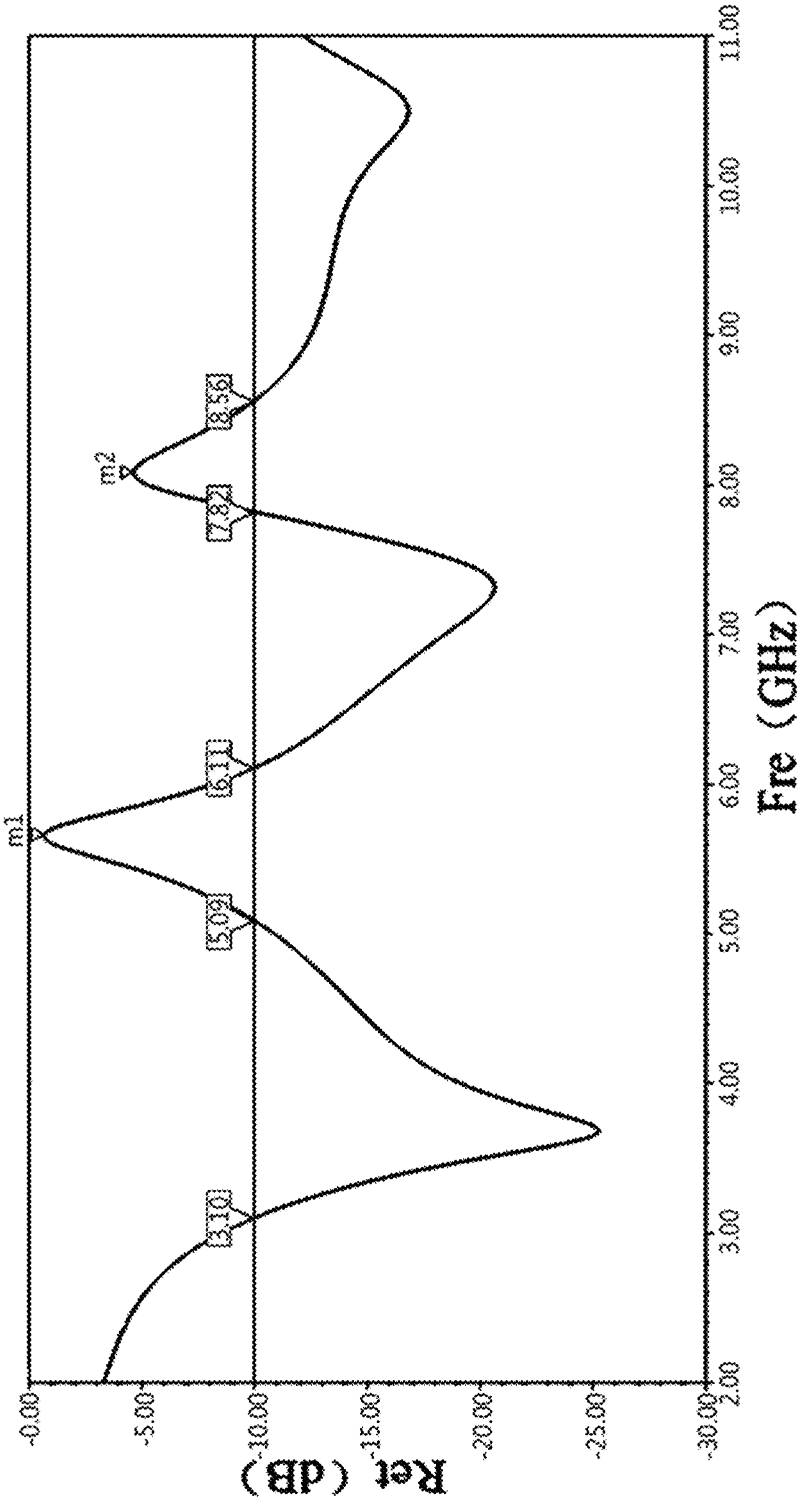
FIG. 4 is a schematic diagram of a return loss curve in an embodiment of the present disclosure.
Figure 5:
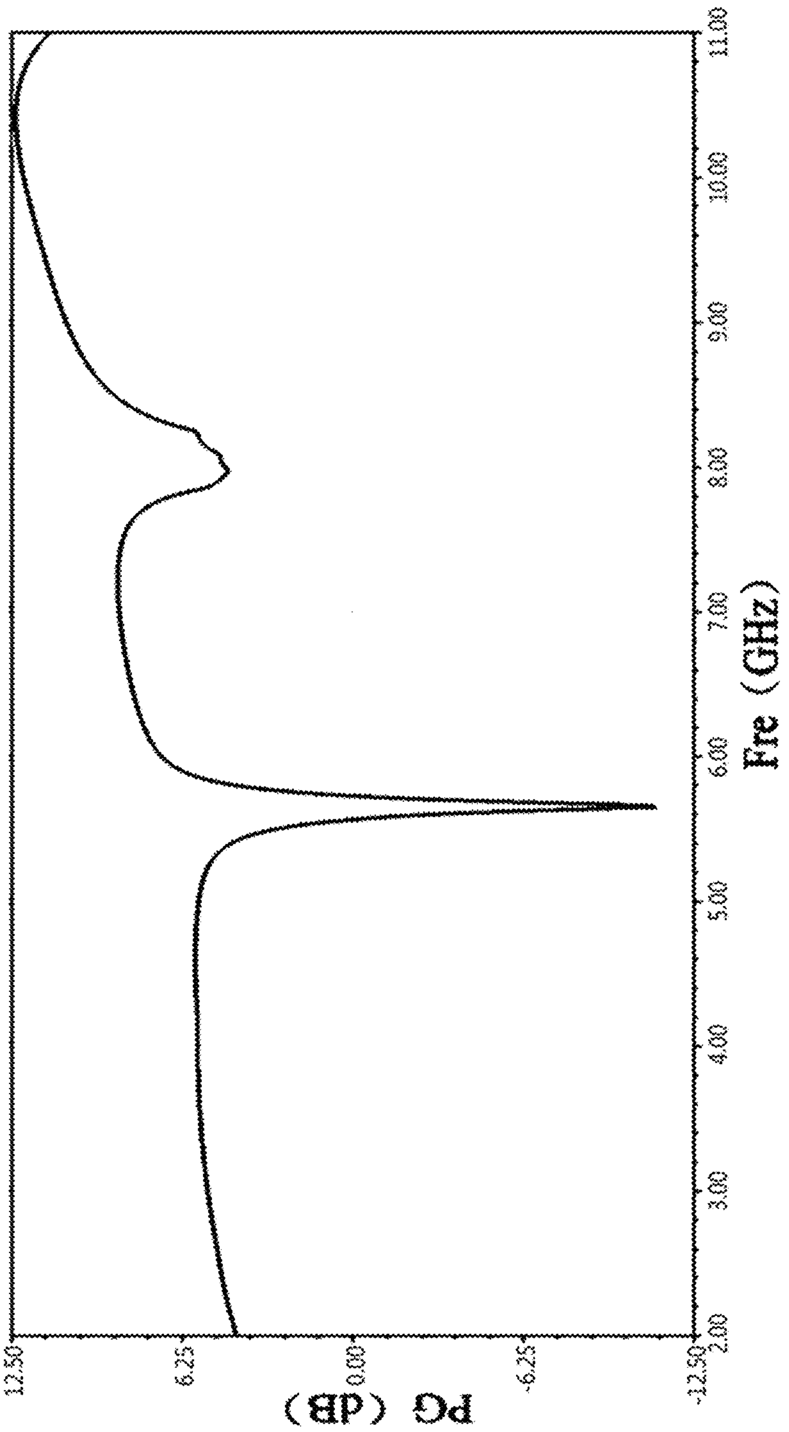
FIG. 5 is a schematic diagram of a gain curve in an embodiment of the present disclosure.

Taking the ultra wide band antenna structure shown in FIG. 3 as an example, a return loss curve and a gain curve are simulated. A simulation result of the return loss curve is as shown in FIG. 4, and a simulation result of the gain curve is as shown in FIG. 5. In FIG. 4, a horizontal axis represents frequency, and a longitudinal axis represents return loss. In FIG. 5, a horizontal axis represents frequency, and a longitudinal axis represents gain. It can be known from FIG. 4 that when the ultra wide band antenna structure is at −10 dB, an impedance bandwidth may be 3.10 GHz-5.09 GHZ, 6.11 GHz-7.82 GHz and 8.56 GHZ-11.0 GHz, so as to realize a filter function in a global microwave Internet frequency band, a wireless local area network frequency band and a satellite communication frequency band. It can be known from FIG. 5 that the filter function in the wireless local area network frequency band is better than that of the satellite communication frequency band, the selectivity and out-of-band rejection of a pass band are better, and antenna gains in other frequency band ranges are all greater than 6 dB.

Figure 6A:
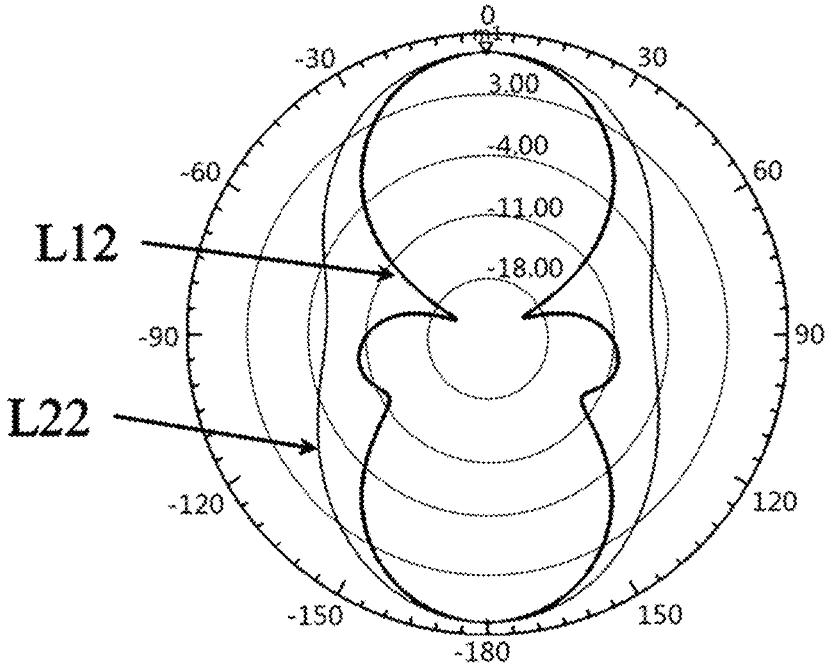
FIG. 6A is a radiation pattern of a E-plane and a H-plane when a frequency point of an ultra wide band antenna structure in an embodiment of the present disclosure is at 3.69 GHz.
Figure 6B:
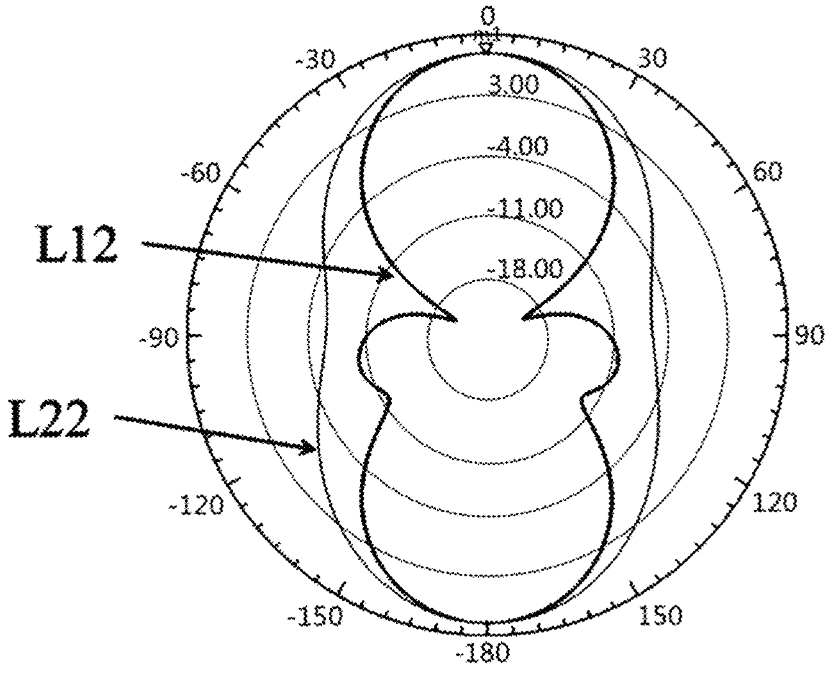
FIG. 6B is a radiation pattern of a E-plane and a H-plane when a frequency point of an ultra wide band antenna structure in an embodiment of the present disclosure is at 7.3 GHZ.
Figure 6C:
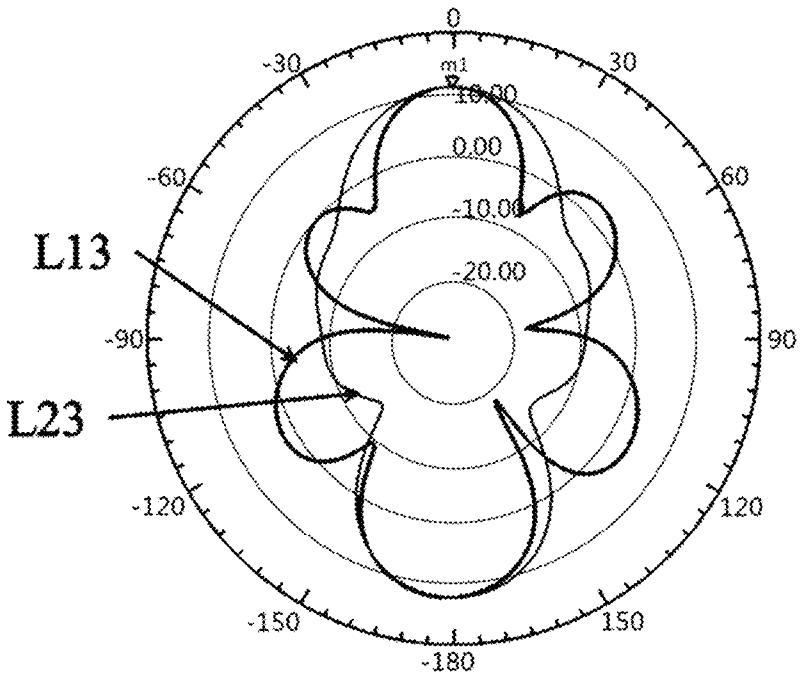
FIG. 6C is a radiation pattern of a E-plane and a H H-plane when a frequency point of an ultra wide band antenna structure in an embodiment of the present disclosure is at 10.5 GHz.

In addition, FIG. 6A illustrates a radiation pattern of the ultra wide band antenna structure when a resonance frequency point is at 3.69 GHz, FIG. 6B illustrates a radiation pattern of the ultra wide band antenna structure when a resonance frequency point is at 7.30 GHz, and FIG. 6C illustrates a radiation pattern of the ultra wide band antenna structure when a resonance frequency point is at 10.5 GHZ. In FIG. 6A, L11 represents a radiation direction of the ultra wide band antenna structure in a E-plane, and L21 represents a radiation direction of the ultra wide band antenna structure in a H-plane. In FIG. 6B, L12 represents a radiation direction of the ultra wide band antenna structure in a E-plane, and L22 represents a radiation direction of the ultra wide band antenna structure in a H-plane. In FIG. 6C, L13 represents a radiation direction of the ultra wide band antenna structure in a E-plane, and L23 represents a radiation direction of the ultra wide band antenna structure in a H-plane. It can be found that radiation of the above ultra wide band antenna structure fundamentally meets the quasi-omnidirectional radiation characteristics at 3.69 GHz and 7.3 GHZ, the radiation of the above ultra wide band antenna structure has a certain distortion at a high frequency of 10.5 GHZ, but the situation of lobe splitting does not appear, and the communication requirement is also met. It can be illustrated that the radiation characteristics of the ultra wide band antenna structure have high stability in the overall communication frequency band.

Figure 7A:
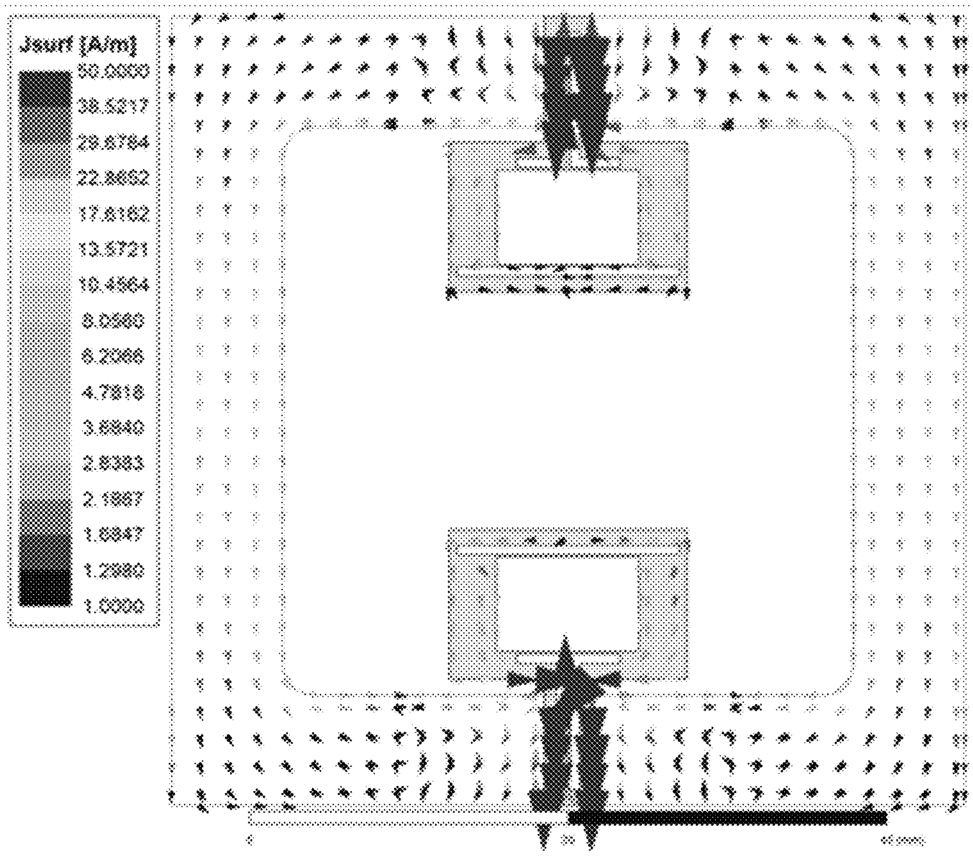
FIG. 7A is a vector distribution diagram of a surface current of a radiation patch, a feeder line and a ground layer when an ultra wide band antenna structure in an embodiment of the present disclosure is at 3.69 GHz.
Figure 7B:
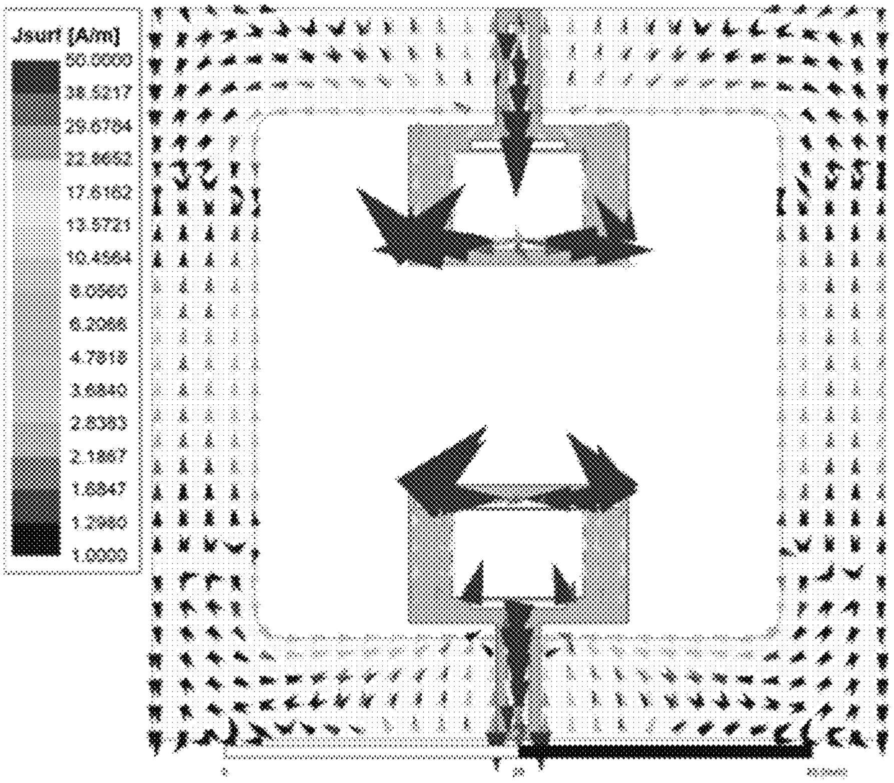
FIG. 7B is a vector distribution diagram of a surface current of a radiation patch, a feeder line and a ground layer when an ultra wide band antenna structure in an embodiment of the present disclosure is at 7.3 GHZ.
Figure 7C:
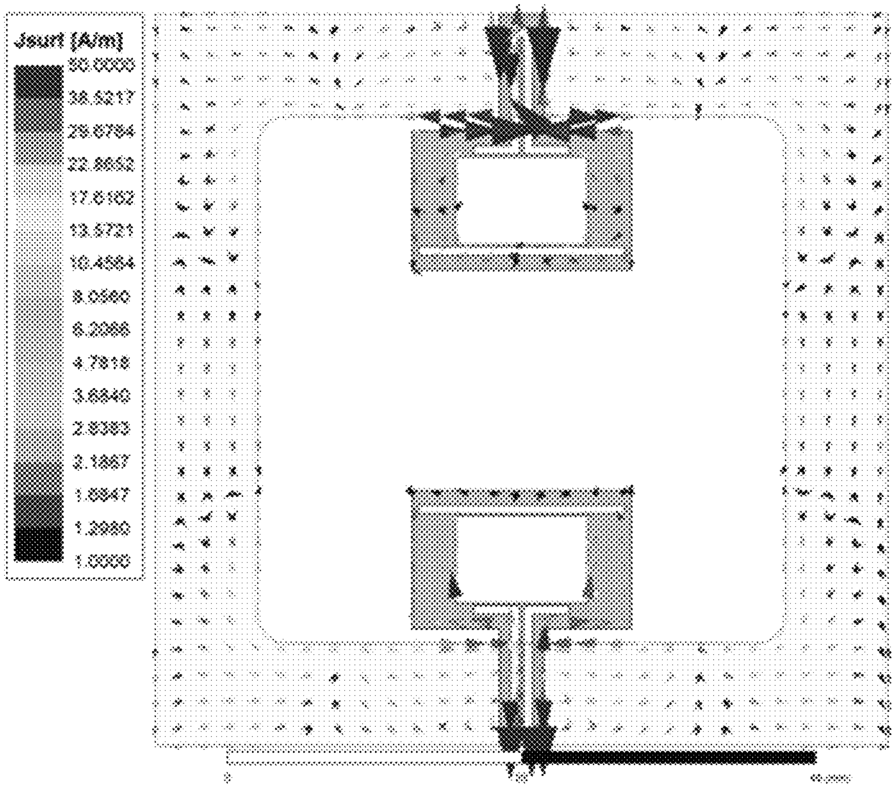
FIG. 7C is a vector distribution diagram of a surface current of a radiation patch, a feeder line and a ground layer when an ultra wide band antenna structure in an embodiment of the present disclosure is at 10.5 GHZ.

In addition, FIG. 7A illustrates a vector distribution diagram of a surface current of the radiation patch 31, the feeder line 32 and the ground layer when the ultra wide band antenna structure is at the resonance frequency point of 3.69 GHz, FIG. 7B illustrates a vector distribution diagram of a surface current of the radiation patch 31, the feeder line 32 and the ground layer when the ultra wide band antenna structure is at the resonance frequency point of 7.30 GHz, and FIG. 7C illustrates a vector distribution diagram of a surface current of the radiation patch 31, the feeder line 32 and the ground layer when the ultra wide band antenna structure is at the resonance frequency point of 10.5 GHz. It can be found that the intensity of the peripheral current of the ground layer is larger at 3.6 GHZ, the intensity of the surface current of the ground layer and the intensity of the surface current of the radiation patch 31 are both larger at 7.3 GHZ, and the intensity of the surface current of the radiation patch 31 is weakened and the intensity of the surface current of the ground layer is increased at 10.5 GHZ. In conclusion, an overall thickness of the ultra wide band antenna structure provided by the embodiments of the present disclosure may be $0.02\lambda_0$ (corresponding vacuum wavelength), and the ultra wide band antenna structure is low in overall profile and high gain, and meets the requirements of a wireless communication device for thin antennas.

Figure 8:
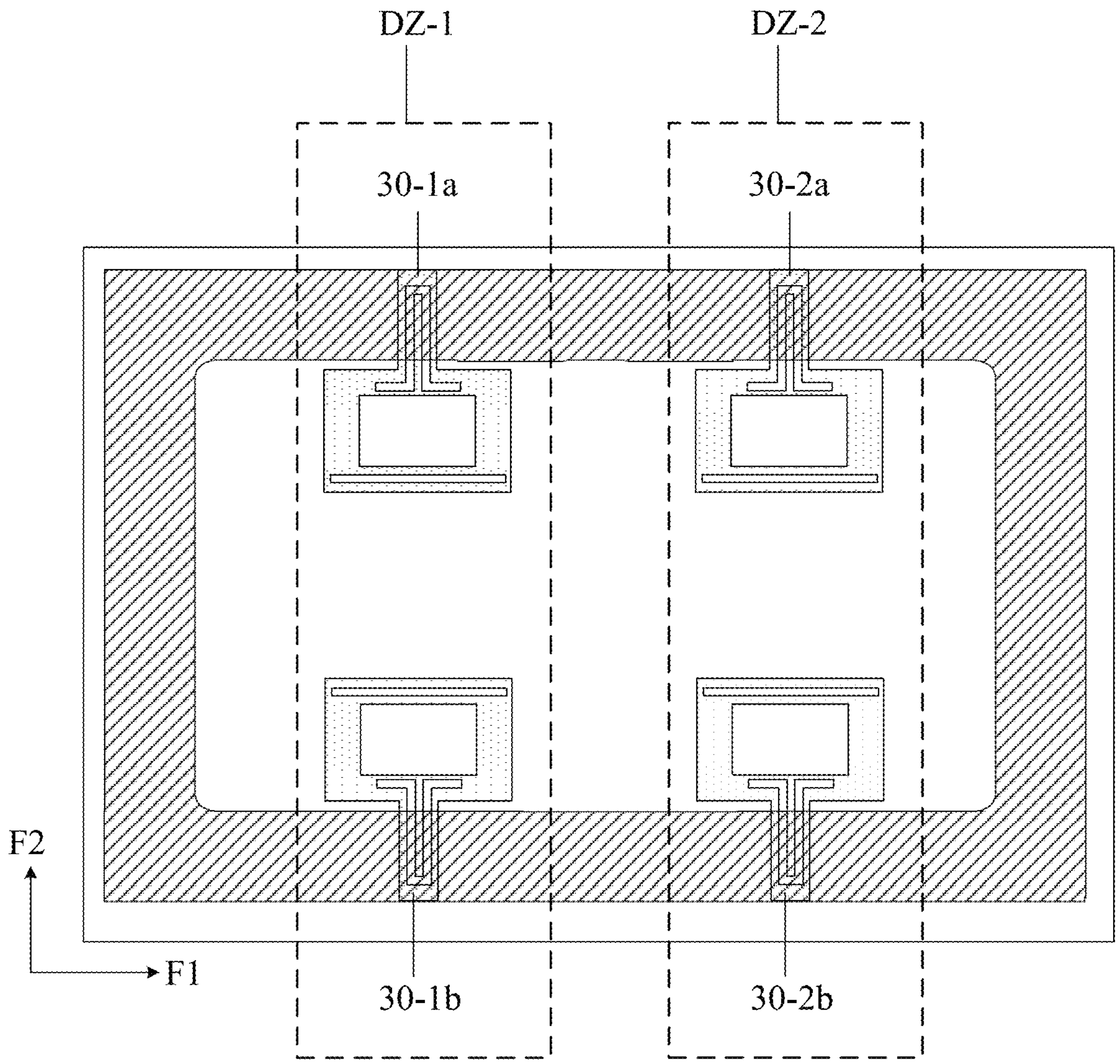
FIG. 8 is yet another structural schematic diagram of an ultra wide band antenna structure provided by an embodiment of the present disclosure.

The embodiments of the present disclosure provide another structural schematic diagram of the ultra wide band antenna structure, and as shown in FIG. 8, transformation is performed aiming at implementations in the above embodiments. The following only illustrates differences between this embodiment and the above embodiments, and similarities are not repeated here.

In some embodiments of the present disclosure, when the plurality of antenna elements are arranged on the dielectric substrate, the different antenna elements may be sequentially arranged at intervals in the same direction. For example, as shown in FIG. 8, the two antenna elements DZ-1 and DZ-2 are arranged on the dielectric substrate 10. The antenna structures 30-1*a* and 30-1*b* in the antenna element DZ-1 are mirrored and oppositely arranged. The antenna structures 30-2*a* and 30-2*b* in the antenna element DZ-2 are mirrored and oppositely arranged. In addition, the antenna elements DZ-1 and DZ-2 are arranged at intervals in the first direction F1.

Figure 9:
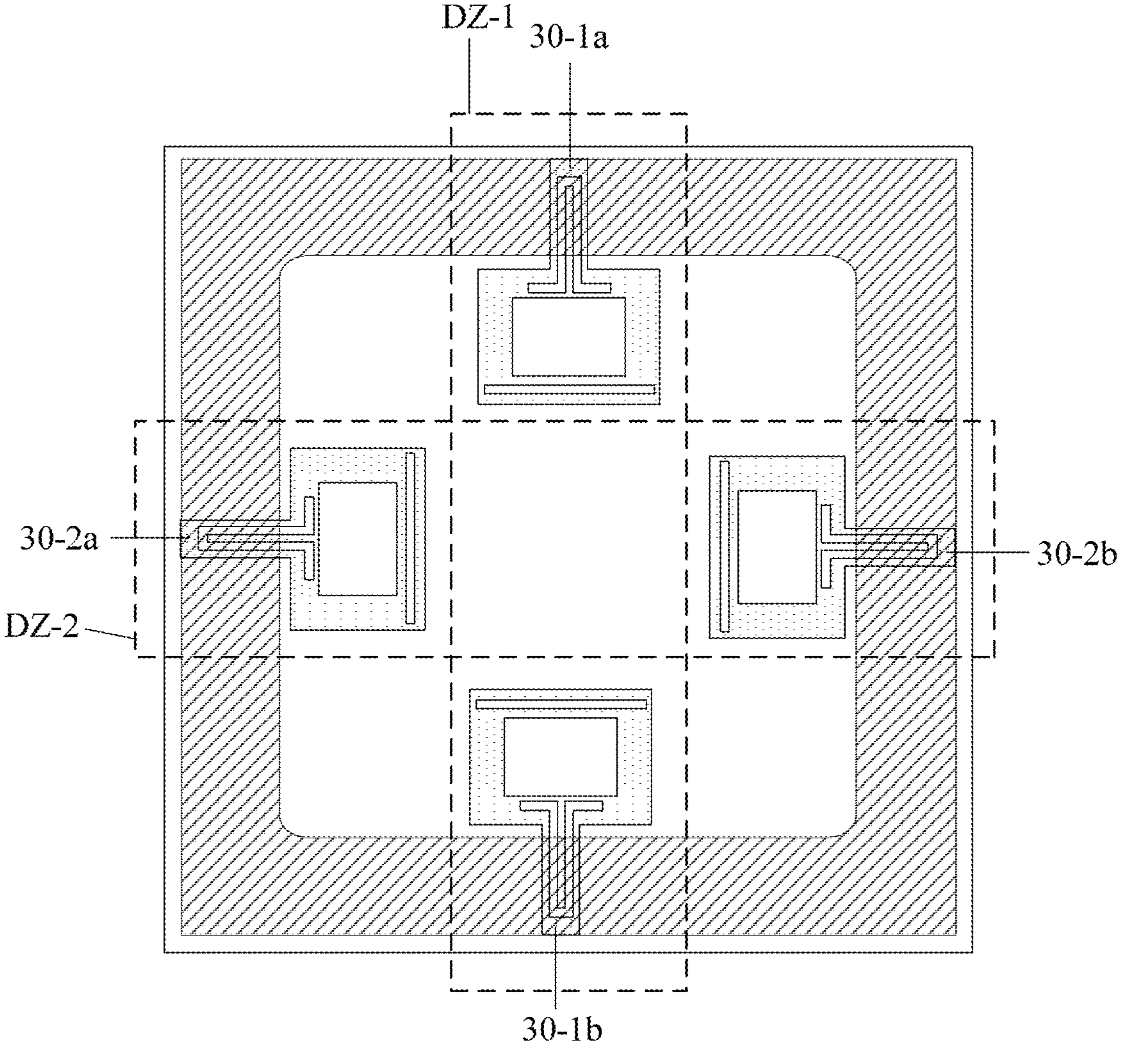
FIG. 9 is yet another structural schematic diagram of an ultra wide band antenna structure provided by an embodiment of the present disclosure.

The embodiments of the present disclosure provide yet another structural schematic diagram of the ultra wide band antenna structure, and as shown in FIG. 9, transformation is performed aiming at implementations in the above embodiments. The following only illustrates differences between the embodiment and the above embodiments, and similarities are not repeated here.

In some embodiments of the present disclosure, when the plurality of antenna elements are arranged on the dielectric substrate, connecting lines of the antenna structures in the at least two antenna elements may intersect with each other. For example, as shown in FIG. 9, the two antenna elements DZ-1 and DZ-2 are arranged on the dielectric substrate 10. The antenna structures 30-1*a* and 30-1*b* in the antenna element DZ-1 are mirrored and oppositely arranged. The antenna structures 30-2*a* and 30-2*b* in the antenna element DZ-2 are mirrored and oppositely arranged. In addition, a connecting line of the antenna structures 30-1*a* and 30-1*b* in the antenna element DZ-1 intersects with a connecting line of the antenna structures 30-2*a* and 30-2*b* in the antenna element DZ-2. For example, the connecting line of the antenna structures 30-1*a* and 30-1*b* in the antenna element DZ-1 and the connecting line of the antenna structures 30-2*a* and 30-2*b* in the antenna element DZ-2 form a cross-shaped structure.

Figure 10A:
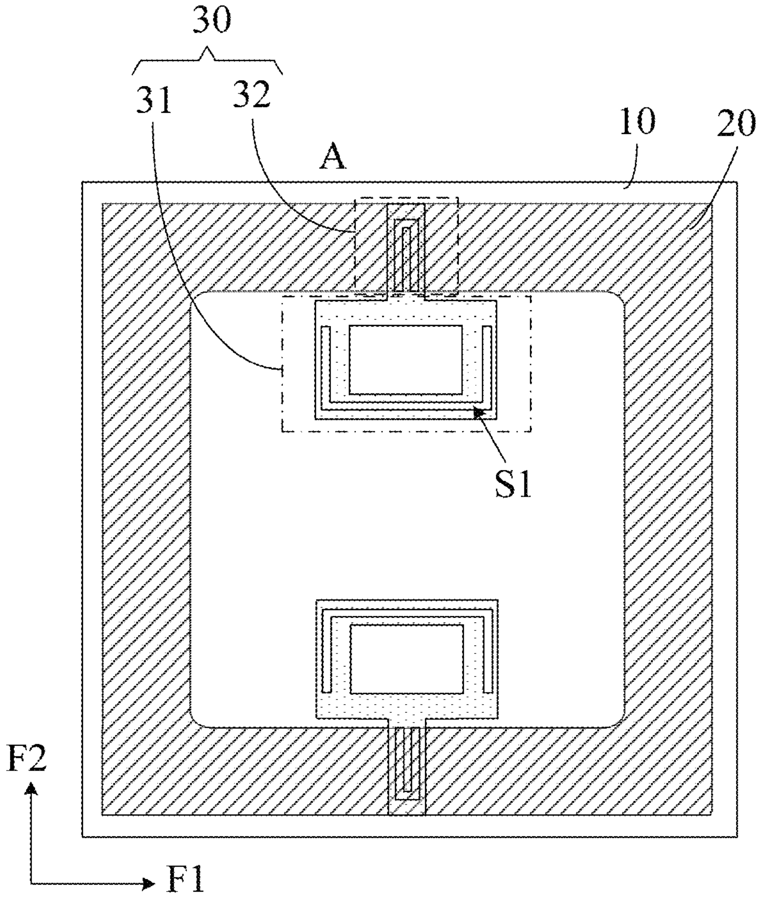
FIG. 10A is yet another structural schematic diagram of an ultra wide band antenna structure provided by an embodiment of the present disclosure.
Figure 10B:
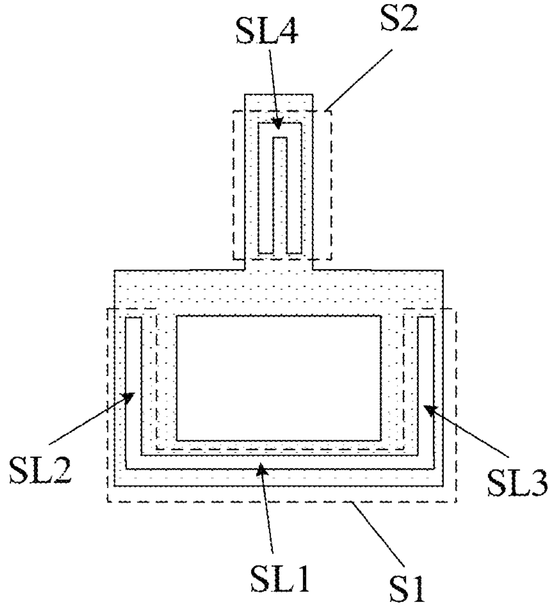
FIG. 10B is yet another structural schematic diagram of a radiation patch provided by an embodiment of the present disclosure.

The embodiments of the present disclosure provide yet another structural schematic diagram of the ultra wide band antenna structure, and as shown in FIG. 10A and FIG. 10B, transformation is performed aiming at implementations in the above embodiments. The following only illustrates differences between the embodiment and the above embodiments, and similarities are not repeated here.

In some embodiments of the present disclosure, as shown in FIG. 10A and FIG. 10B, the first hollowed-out slit S1 may include a first slit part SL1, a second slit part SL2 and a third slit part SL3, the first slit part SL1 extends in the first direction F1, and the second slit part SL2 and the third slit part SL3 extend in the second direction F2. In addition, the second slit part SL2 is connected with the first end ds11 of the first slit part SL1, and the third slit part SL3 is connected with the second end ds12 of the first slit part SL1.

That is, the first slit part SL1, the second slit part SL2 and the third slit part SL3 form the first hollowed-out slit S1, in this way, the first hollowed-out slit S1 may be arranged to be a U-shaped slit, the second hollowed-out slit S2 may include the fourth slit part SL4, and the fourth slit part SL4 is in an n shape.

Figure 11:
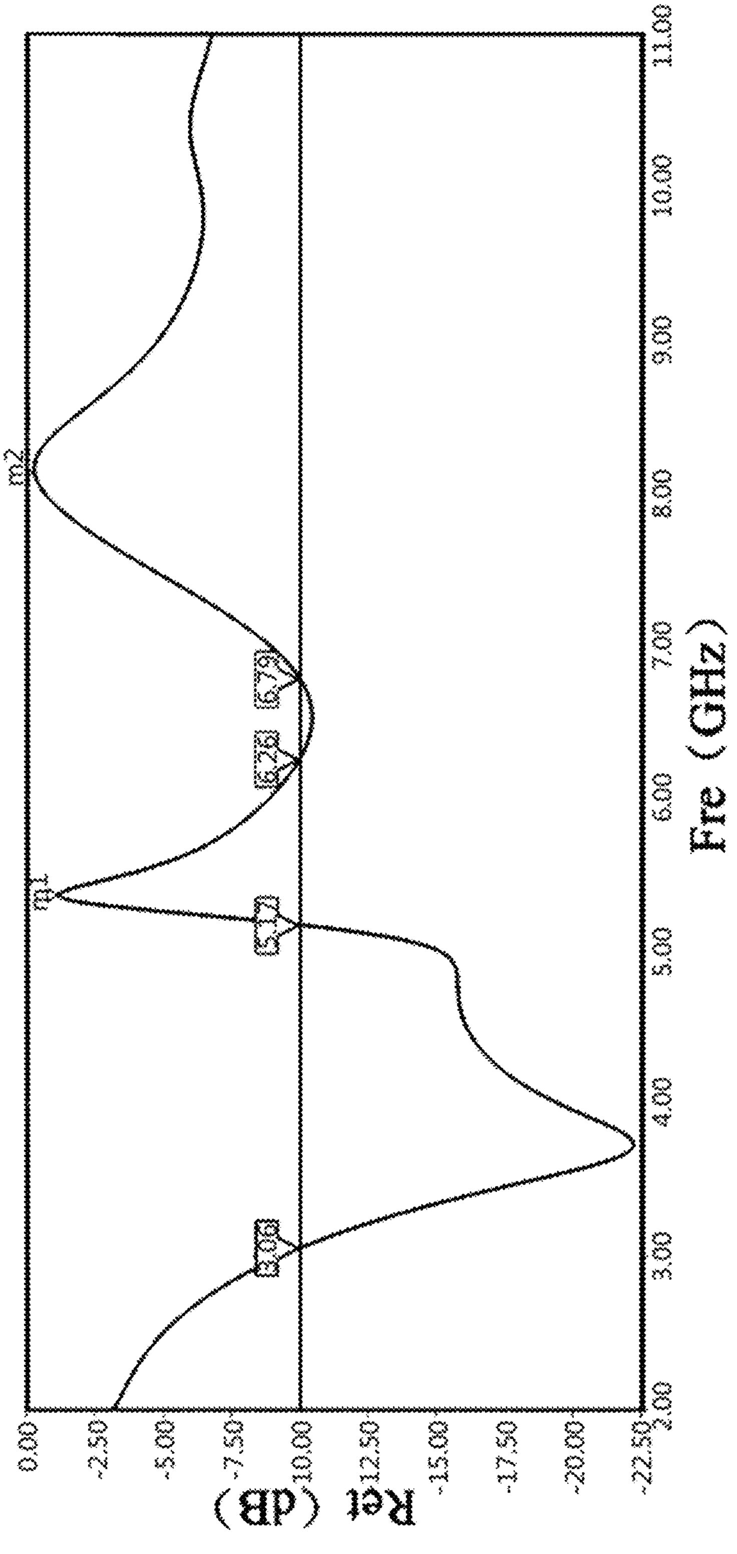
FIG. 11 is a schematic diagram of another return loss curve in an embodiment of the present disclosure.

Taking the ultra wide band antenna structure shown in FIG. 10A as an example, a return loss curve thereof is simulated. A simulation result of the return loss curve is as shown in FIG. 11, it can be known from FIG. 11 that when the ultra wide band antenna structure is at −10 dB, an impedance bandwidth may be 3.06 GHZ-5.17 GHz and 6.26 GHz-6.79 GHz, so as to realize a filter function in a wireless local area network frequency band. Although compared with the embodiments corresponding to FIG. 3, the impedance bandwidth in the embodiment is narrowed after adding the band resistance structure formed by the first hollowed-out slit S1 and the second hollowed-out slit S2, and does not meet the requirements at the high frequency, but the band resistance structure combination may also realize the notch wave characteristics well as long as a size of the band resistance structure is further optimized.

Figure 12:
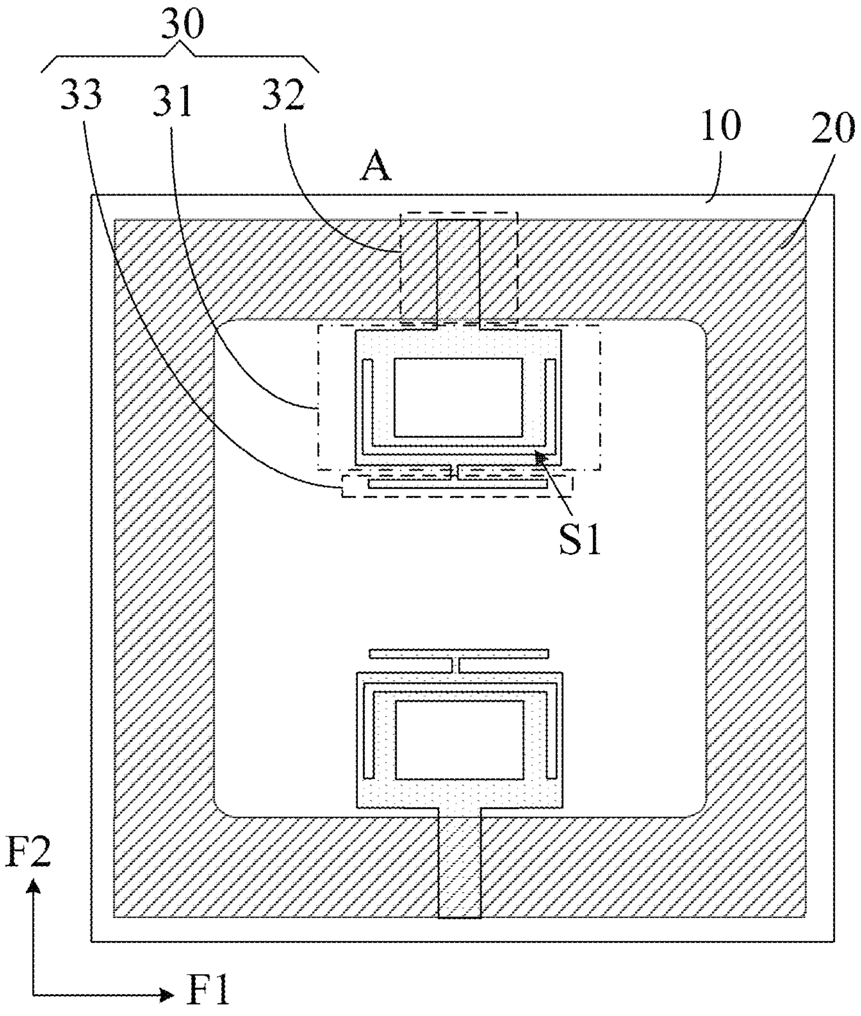
FIG. 12 is another structural schematic diagram of an ultra wide band antenna structure provided by an embodiment of the present disclosure.

The embodiments of the present disclosure provide yet another structural schematic diagram of the ultra wide band antenna structure, and as shown in FIG. 12, transformation is performed aiming at implementations in the above embodiments. The following only illustrates differences between the embodiment and the above embodiments, and similarities are not repeated here.

In some embodiments of the present disclosure, as shown in FIG. 12, the antenna structure 30 may further include a branch structure 33 connected with the radiation patch, and the branch structure 33 is located on a side, away from the feeder line 32, of the radiation patch 31. In addition, a gap is formed between an orthographic projection of the radiation patch 31 on the dielectric substrate 10 and an orthographic projection of the connected branch structure 33 on the dielectric substrate 10. In addition, the radiation patch 31 has the first hollowed-out slit S1, so as to enable the first hollowed-out slit S1 to be as the band resistance structure, and the branch structure may also serve as the band resistance structure, so as to realize the notch wave characteristics of the antenna structure 30 in the needed frequency band to avoid interference with other communication systems in narrow frequency bands. Exemplarily, the branch structure extends in the first direction, and a length of the branch structure 33 is related to λ/2. For example, when the frequency band of the needed notch wave is the frequency band corresponding to the wireless local area network, λ may be evaluated from 5.15 GHz to 5.825 GHz. For example, when the frequency band of the needed notch wave is the frequency band corresponding to the satellite communication system, λ may be evaluated from 8.025 GHz to 8.4 GHz. In this way, the first hollowed-out slit S1 may serve as the band resistance structure to realize the notch wave characteristics of the antenna structure 30 in the needed frequency band to avoid interference with other communication systems in narrow frequency bands.

Figure 13:
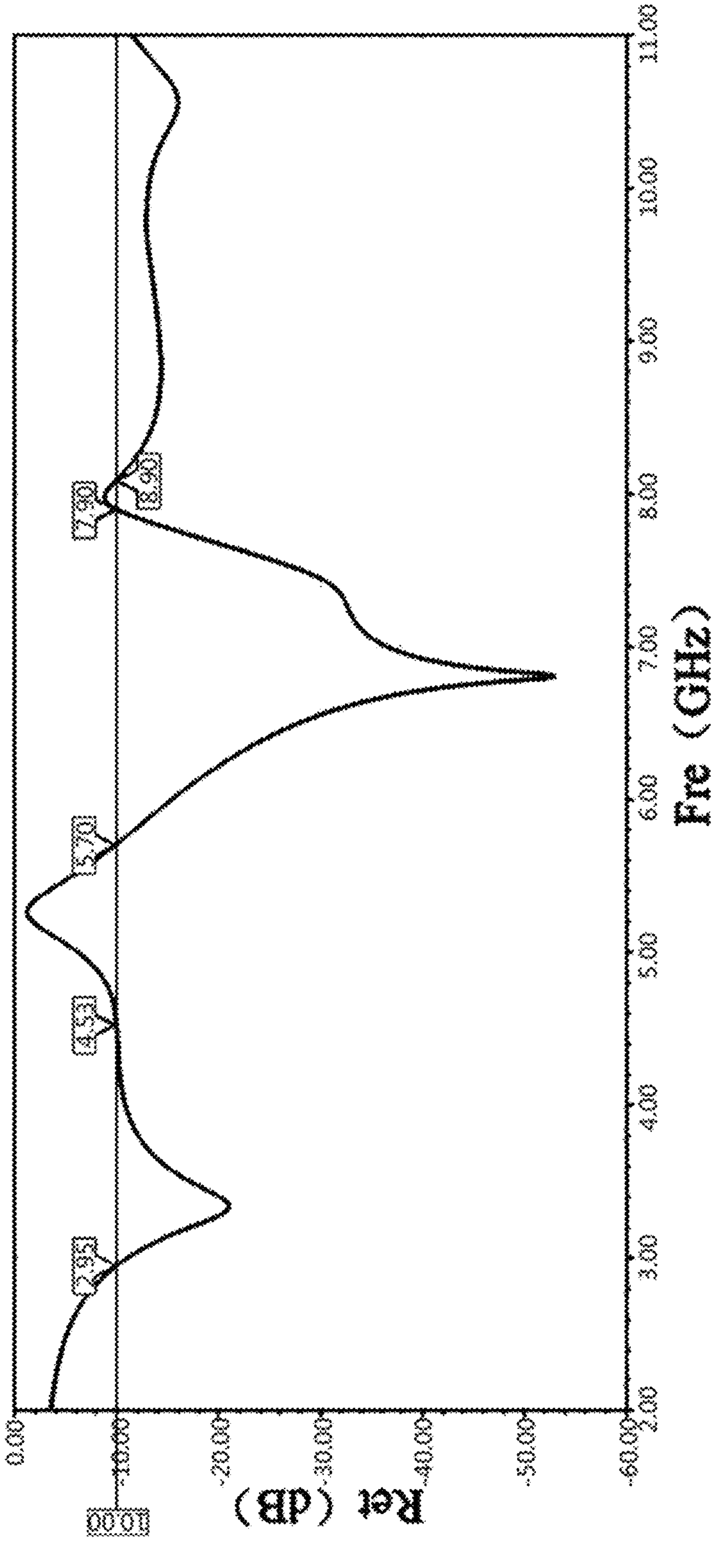
FIG. 13 is a schematic diagram of yet another return loss curve in an embodiment of the present disclosure.

Taking the ultra wide band antenna structure shown in FIG. 12 as an example, a return loss curve thereof is simulated. A simulation result of the return loss curve is as shown in FIG. 13, it can be known from FIG. 13 that when the ultra wide band antenna structure is at −10 dB, an impedance bandwidth may be 2.95 GHZ-4.53 GHZ, 5.7 GHZ-7.90 GHz and 8.09 GHz-11.0 GHz, so as to realize a filter function in a wireless local area network frequency band. Although compared with the embodiments corresponding to FIG. 3, the impedance bandwidth in the embodiment is narrowed after adding the band resistance structure, the filter function in the satellite communication frequency band is not completely realized, but the band resistance structure combination may also realize the notch wave characteristics well as long as a size of the band resistance structure is further optimized.

The embodiments of the present disclosure further provide an electronic device, including any one of the above ultra wide band antenna structures. The principle of the electronic device solving the problem is similar to that of the above-mentioned ultra wide band antenna structure, so that the implementation of the electronic device may refer to the implementation of the above-mentioned ultra wide band antenna structure, and the repetition is omitted here.

In the embodiments of the present disclosure, the electronic device, for example, may be a communication base station product, a mobile product and products of other structures provided with chips, antennas and other components, which is not limited here.

Those of ordinary skill in the art should understand that the embodiments of the present disclosure may be a method, a system or a computer program product. Therefore, the present disclosure may adopt a form of a full-hardware embodiment, a full-software embodiment or an embodiment combining software with hardware. In addition, the present disclosure may adopt a form of a computer program product implemented on one or more computer available storage media (including but not limited to a disk memory, a CD-ROM, an optical memory and the like) including computer available program codes.

The present disclosure is described by referring to flow diagrams and/or block diagrams of methods, devices (systems) and computer program products according to the embodiments of the present disclosure. It should be understood that each flow and/or block in the flow diagrams and/or the block diagrams, and a combination of flows and/or blocks in the flow diagrams and/or the block diagrams may be implemented by computer program instructions. These computer program instructions may be provided for a general-purpose computer, a special-purpose computer, an embedded processor or other processors of programmable data processing devices to generate a machine, so as to generate an apparatus for implementing designated functions in one flow or a plurality of flows in the flow diagrams and/or one block or a plurality of blocks in the block diagrams through the instructions executed by the computer or the processors of other programmable data processing devices.

These computer program instructions may also be stored in a computer readable memory capable of guiding the computer or other programmable data processing devices to work in a specific mode, so as to enable the instructions stored in the computer readable memory to generate manufacture materials including instruction apparatuses, and the instruction apparatuses implement functions designated in one flow or the plurality of flows in the flow diagrams and/or one block or the plurality of blocks in the block diagrams.

These computer program instructions may also be loaded to the computer or other programmable data processing devices to execute a series of operation steps on the computer or other programmable data processing devices to generate processing implemented by the computer, so that the instructions executed on the computer or other programmable data processing devices provide steps for implementing the functions designated in one flow or the plurality of flows in the flow diagrams and/or one block or the plurality of blocks in the block diagrams.

Although the preferred embodiments of the present disclosure have been described, additional changes and modifications may be made to these embodiments once the basic creative concepts are known to those skilled in the art. Therefore, the appended claims are intended to include the preferred embodiments and all changes and modifications falling within the scope of the present disclosure.

It will be apparent to those skilled in the art that various changes and modifications may be made to the present disclosure without departing from the spirit or scope of the present disclosure. In this way, if these changes and modifications of the present disclosure fall within the scope of the claims of the present disclosure and their equivalent art, the present disclosure also intends to include these changes and modifications.

What is claimed is:

1. An ultra wide band antenna structure, comprising:
a dielectric substrate;
an antenna structure, located on a side of the dielectric substrate, wherein the antenna structure comprises a radiation patch and a feeder line; and
a ground layer, located on a side of the dielectric substrate facing away from the antenna structure;
wherein the radiation patch has a first hollowed-out slit, in a same antenna structure, the first hollowed-out slit is located in a side of the radiation patch away from the feeder line; and a length of the first hollowed-out slit is related to λ/2; and λ represents a wave length in a frequency band of a needed notch wave;
the first hollowed-out slit comprises a first slit part, a second slit part and a third slit part; wherein the first slit part extends in a first direction, the second slit part and the third slit part respectively extend in a second direction, and the first direction intersects with the second direction; the second slit part is connected with a first end of the first slit part, the third slit part is connected with a second end of the first slit part, and the first slit part extends from the first end of the first slit part to the second end of the first slit part.

2. The ultra wide band antenna structure according to claim 1, wherein
the feeder line has a second hollowed-out slit, and a length of the second hollowed-out slit is related to λ/2.

3. The ultra wide band antenna structure according to claim 2, wherein the second hollowed-out slit comprises a fourth slit part.

4. The ultra wide band antenna structure according to claim 3, wherein the radiation patch further comprises a fifth slit part and a sixth slit part which are mirrored;
the fifth slit part is connected with a first end of the fourth slit part;
the sixth slit part is connected with a second end of the fourth slit part; and
the fourth slit part extends from the first end of the fourth slit part to the second end of the fourth slit part.

5. The ultra wide band antenna structure according to claim 1, wherein the antenna structure further comprises a branch structure connected with the radiation patch; the branch structure is arranged at a side of the radiation patch away from the feeder line; and
a gap is formed between an orthographic projection of the radiation patch on the dielectric substrate and an orthographic projection of the branch structure on the dielectric substrate.

6. The ultra wide band antenna structure according to claim 5, wherein the branch structure extends in the first direction, and a length of the branch structure is related to λ/2.

7. The ultra wide band antenna structure according to claim 1, wherein the radiation patch is annularly arranged on the dielectric substrate, and the ground layer is annularly arranged on the dielectric substrate;
the orthographic projection of the radiation patch on the dielectric substrate does not overlap with an orthographic projection of the ground layer on the dielectric substrate; and
an orthographic projection of the feeder line on the dielectric substrate overlaps with the orthographic projection of the ground layer on the dielectric substrate.

8. The ultra wide band antenna structure according to claim 7, wherein the orthographic projection of the ground layer on the dielectric substrate is approximately rectangular.

9. The ultra wide band antenna structure according to claim 8, wherein at least one inner vertex angle of the rectangle is an arc.

10. The ultra wide band antenna structure according to claim 1, wherein at least one antenna element is arranged on the dielectric substrate, and each antenna element comprises two antenna structures; and
in a same antenna element, the two antenna structures are symmetrically mirrored and oppositely arranged.

11. The ultra wide band antenna structure according to claim 10, wherein different antenna elements are sequentially arranged at intervals along a same direction.

12. The ultra wide band antenna structure according to claim 10, wherein connecting lines of the antenna structures in at least two antenna elements intersect with each other.

13. The ultra wide band antenna structure according to claim 1,
wherein the radiation patch comprises a monopole structure.

14. An electronic device, comprising the ultra wide band antenna structure according to claim 1.

15. An ultra wide band antenna structure, comprising:
a dielectric substrate;
an antenna structure, located on a side of the dielectric substrate, wherein the antenna structure comprises a radiation patch, a feeder line, and a branch structure connected with the radiation patch; wherein the branch structure is arranged at a side of the radiation patch away from the feeder line, and a gap is formed between an orthographic projection of the radiation patch on the dielectric substrate and an orthographic projection of the branch structure on the dielectric substrate; and a ground layer, located on a side of the dielectric substrate facing away from the antenna structure;

wherein the radiation patch has a first hollowed-out slit, and a length of the first hollowed-out slit is related to λ/2; and λ represents a wave length in a frequency band of a needed notch wave.

16. The ultra wide band antenna structure according to claim 15, wherein the branch structure extends in a first direction, and a length of the branch structure is related to λ/2.

17. The ultra wide band antenna structure according to claim 15, wherein in a same antenna structure, the first hollowed-out slit is located in a side of the radiation patch away from the feeder line.

18. An ultra wide band antenna structure, comprising:

a dielectric substrate;

an antenna structure, located on a side of the dielectric substrate, wherein the antenna structure comprises a radiation patch and a feeder line; and a ground layer, located on a side of the dielectric substrate facing away from the antenna structure;

wherein the radiation patch has a first hollowed-out slit, and a length of the first hollowed-out slit is related to λ/2; and λ represents a wave length in a frequency band of a needed notch wave;

the radiation patch is annularly arranged on the dielectric substrate, and the ground layer is annularly arranged on the dielectric substrate;

the orthographic projection of the radiation patch on the dielectric substrate does not overlap with an orthographic projection of the ground layer on the dielectric substrate; and an orthographic projection of the feeder line on the dielectric substrate overlaps with the orthographic projection of the ground layer on the dielectric substrate.

19. The ultra wide band antenna structure according to claim 18, wherein the orthographic projection of the ground layer on the dielectric substrate is approximately rectangular.

20. The ultra wide band antenna structure according to claim 19, wherein at least one inner vertex angle of the rectangle is an arc.

* * * * *